(12) United States Patent
Discekici et al.

(10) Patent No.: US 12,227,659 B2
(45) Date of Patent: Feb. 18, 2025

(54) THREE-DIMENSIONAL PRINTING WITH PORE-PROMOTING AGENTS

(71) Applicant: Hewlett-Packard Development Company, L.P., Spring, TX (US)

(72) Inventors: Emre Hiro Discekici, San Diego, CA (US); Shannon Reuben Woodruff, San Diego, CA (US); Stephen G. Rudisill, San Diego, CA (US); Alexey S. Kabalnov, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 316 days.

(21) Appl. No.: 17/298,923

(22) PCT Filed: Jun. 10, 2019

(86) PCT No.: PCT/US2019/036229
§ 371 (c)(1),
(2) Date: Jun. 1, 2021

(87) PCT Pub. No.: WO2020/251520
PCT Pub. Date: Dec. 17, 2020

(65) Prior Publication Data
US 2022/0089892 A1    Mar. 24, 2022

(51) Int. Cl.
*C09D 11/38* (2014.01)
*B29C 64/165* (2017.01)
(Continued)

(52) U.S. Cl.
CPC ............ *C09D 11/38* (2013.01); *B29C 64/165* (2017.08); *B33Y 10/00* (2014.12); *B33Y 70/00* (2014.12);
(Continued)

(58) Field of Classification Search
CPC ..... C09D 11/38; C09D 11/033; C09D 11/037; C09D 11/104; C09D 11/107;
(Continued)

(56) References Cited

U.S. PATENT DOCUMENTS

| 4,382,884 A | * 5/1983 | Rohringer ............ A62D 1/0071 252/606 |
| 5,490,962 A | 2/1996 | Cima et al. |

(Continued)

FOREIGN PATENT DOCUMENTS

| AT | A144297 A | 1/1999 |
| EP | 3287213 A1 | 2/2018 |

(Continued)

OTHER PUBLICATIONS

Lasman, Henry R., "Foamed Plastics", edited by Shanghai Institute of Light Industry, pp. 1-14, published by Shanghai Science and Technology Compilation Center, Apr. 1966.

(Continued)

*Primary Examiner* — Jeffrey M Wollschlager
(74) *Attorney, Agent, or Firm* — HP Inc. Patent Department (57) ABSTRACT

The present disclosure describes multi-fluid kits for three-dimensional printing, materials kits for three-dimensional printing, and methods of making three-dimensional printed articles. In one example, a multi-fluid kit for three-dimensional printing can include a fusing agent and a pore-promoting agent. The fusing agent can include water and a radiation absorber. The radiation absorber can absorb radiation energy and convert the radiation energy to heat. The pore-promoting agent can include water and a water-soluble pore-promoting compound. The pore-promoting compound can chemically react at an elevated temperature to generate a gas.

7 Claims, 4 Drawing Sheets

(51) Int. Cl.
*B29K 77/00* (2006.01)
*B33Y 10/00* (2015.01)
*B33Y 70/00* (2020.01)
*B33Y 70/10* (2020.01)
*C08K 3/26* (2006.01)
*C08L 77/02* (2006.01)
*C09D 11/033* (2014.01)
*C09D 11/037* (2014.01)
*C09D 11/104* (2014.01)
*C09D 11/107* (2014.01)
*C09D 11/108* (2014.01)
*C09D 11/324* (2014.01)

(52) U.S. Cl.
CPC ............... *B33Y 70/10* (2020.01); *C08K 3/26* (2013.01); *C08L 77/02* (2013.01); *C09D 11/033* (2013.01); *C09D 11/037* (2013.01); *C09D 11/104* (2013.01); *C09D 11/107* (2013.01); *C09D 11/108* (2013.01); *C09D 11/324* (2013.01); *B29K 2077/00* (2013.01)

(58) Field of Classification Search
CPC ... C09D 11/108; C09D 11/324; B29C 64/165; B33Y 10/00; B33Y 70/00; B33Y 70/10; C08K 3/26; C08L 77/02; B29K 2077/00; C08J 2375/04; C08J 9/08; C08J 2203/02; C08J 2203/04; C08J 2377/00; C08J 9/10
See application file for complete search history.

(56) References Cited

U.S. PATENT DOCUMENTS

| | | | |
|---|---|---|---|
| 7,094,371 B2 | 8/2006 | Lo | |
| 8,273,368 B2 | 9/2012 | Ambrosio et al. | |
| 8,431,623 B2 | 4/2013 | Shim et al. | |
| 2009/0298667 A1 | 12/2009 | Addiego et al. | |
| 2013/0118377 A1 | 5/2013 | Hamman et al. | |
| 2013/0331927 A1 | 12/2013 | Zheng et al. | |
| 2015/0291921 A1 | 10/2015 | Rives | |
| 2016/0136728 A1 | 5/2016 | Srivas et al. | |
| 2017/0274594 A1 | 9/2017 | Ng et al. | |
| 2017/0291077 A1 | 10/2017 | Madson et al. | |
| 2018/0015663 A1* | 1/2018 | Zhao | B22F 12/40 |
| 2018/0055643 A1 | 3/2018 | Castro et al. | |
| 2018/0126631 A1* | 5/2018 | Nauka | B33Y 70/10 |
| 2018/0133957 A1 | 5/2018 | Ramirez Muela et al. | |
| 2018/0134911 A1 | 5/2018 | Neuman | |
| 2018/0272600 A1 | 9/2018 | Shaarawi et al. | |
| 2018/0354191 A1* | 12/2018 | Nauka | B29C 64/264 |
| 2019/0039296 A1 | 2/2019 | Prasad et al. | |
| 2019/0047216 A1 | 2/2019 | Emamjomeh et al. | |
| 2019/0298523 A1 | 10/2019 | Crudden et al. | |
| 2022/0088855 A1 | 3/2022 | Williams et al. | |

FOREIGN PATENT DOCUMENTS

| | | | |
|---|---|---|---|
| JP | 2016-097578 A | | 5/2016 |
| JP | 2017-057467 A | | 3/2017 |
| JP | 2017057467 | * | 3/2017 |
| KR | 101019186 | | 3/2011 |
| KR | 10-2018-0129059 A | | 12/2018 |
| WO | 2005/072785 A1 | | 8/2005 |
| WO | WO-2015108544 A1 | | 7/2015 |
| WO | WO-2015139129 A1 | | 9/2015 |
| WO | 2017/180118 A1 | | 10/2017 |
| WO | WO2017196321 | * | 11/2017 |
| WO | WO-2018022024 A1 | | 2/2018 |
| WO | 2018093145 | | 5/2018 |
| WO | WO-2018183803 A1 | | 10/2018 |
| WO | 2019/017926 A1 | | 1/2019 |
| WO | 2019/108288 A1 | | 6/2019 |

OTHER PUBLICATIONS

Yaqing, F., et al., "Inorganic chemical foaming agent", Auxiliary Chemistry and Technology, Jun. 30, 1997, pp. 288-291.

* cited by examiner

THREE-DIMENSIONAL PRINTING WITH PORE-PROMOTING AGENTS

BACKGROUND

Methods of three-dimensional (3D) digital printing, a type of additive manufacturing, have continued to be developed over the last few decades. However, systems for 3D printing have historically been very expensive, though those expenses have been coming down to more affordable levels recently. In general, 3D printing technology can shorten the product development cycle by allowing rapid creation of prototype models for reviewing and testing. Unfortunately, the concept has been somewhat limited with respect to commercial production capabilities because the range of materials used in 3D printing is likewise limited. Accordingly, it can be difficult to 3D print functional parts with desired properties such as mechanical strength, visual appearance, and so on. Nevertheless, several commercial sectors such as aviation and the medical industry have benefitted from the ability to rapidly prototype and customize parts for customers.

DETAILED DESCRIPTION

The present disclosure describes multi-fluid kits for three-dimensional printing. In one example, a multi-fluid kit for three-dimensional printing can include a fusing agent including water and a radiation absorber. The radiation absorber can absorb radiation energy and convert the radiation energy to heat. The multi-fluid kit can also include a pore-promoting agent that includes water and a water-soluble pore-promoting compound. The pore-promoting compound can chemically react at an elevated temperature to generate a gas. In further examples, the pore-promoting compound can be carbohydrazide, urea, a urea homologue, a carbamide-containing compound, ammonium carbonate, ammonium nitrate, ammonium nitrite, or a combination thereof. In some examples, the pore-promoting compound can be present in an amount from about 0.5 wt % to about 10 wt % with respect to the total weight of the pore-promoting agent. In certain examples, the elevated temperature at which the pore-promoting compound chemically reacts can be from about 100° C. to about 250° C. In further examples, the radiation absorber in the fusing agent can be a metal dithiolene complex, carbon black, a near-infrared absorbing dye, a near-infrared absorbing pigment, metal nanoparticles, a conjugated polymer, or a combination thereof. In an additional example, the multi-fluid kit can also include a detailing agent that includes a detailing compound. The detailing compound can reduce a temperature of powder bed material onto which the detailing agent is applied.

The present disclosure also describes materials kit for three-dimensional printing. In one example, a three-dimensional printing kit can include a powder bed material including polymer particles, a fusing agent including water and a radiation absorber to selectively apply to the powder bed material, and a pore-promoting agent including water and a water-soluble pore-promoting compound to selectively apply to the powder bed material. The radiation absorber can absorb radiation energy and convert the radiation energy to heat. The pore-promoting compound can chemically react at an elevated temperature to generate a gas. In some examples, the polymer particles can have an average particle size from about 20 μm to about 100 μm and can include nylon 6, nylon 9, nylon 11, nylon 12, nylon 66, nylon 612, polyethylene, thermoplastic polyurethane, polypropylene, polyester, polycarbonate, polyether ketone, polyacrylate, polystyrene powder, wax, or a combination thereof. In other examples, the pore-promoting compound can be carbohydrazide, urea, a urea homologue, a carbamide-containing compound, ammonium carbonate, ammonium nitrate, ammonium nitrite, or a combination thereof. In further examples, the radiation absorber is a metal dithiolene complex, carbon black, a near-infrared absorbing dye, a near-infrared absorbing pigment, metal nanoparticles, a conjugated polymer, or a combination thereof. In certain examples, the elevated temperature at which the pore-promoting compound chemically reacts can be from about 100° C. to about 250° C.

The present disclosure also describes methods of making three-dimensional printed articles. In one example, a method of making a three-dimensional printed article can include iteratively applying individual build material layers of polymer particles to a powder bed. A fusing agent can be selectively jetted onto the individual build material layers based on a three-dimensional object model. The fusing agent can include water and a radiation absorber. A pore-promoting agent can also be selectively jetted onto the individual build material layers based on the three-dimensional object model. The pore-promoting agent can include water and a water-soluble pore-promoting compound, where the pore-promoting compound can chemically react at an elevated temperature to generate a gas. The powder bed can be exposed to energy to selectively fuse the polymer particles in contact with the radiation absorber to form a fused polymer matrix at individual build material layers, thereby heating the pore-promoting compound to the elevated temperature to generate the gas distributed in the fused polymer matrix. In certain examples, the pore-promoting compound can be carbohydrazide, urea, a urea homologue, a carbamide-containing compound, ammonium carbonate, ammonium nitrate, ammonium nitrite, or a combination thereof. In further examples, the elevated temperature can be from about 100° C. to about 250° C. In a particular example, the gas can form isolated pores in the fused polymer matrix, where the pores have an average diameter from about 1 micrometer to about 500 micrometers.

The multi-fluid kits, materials kits, and methods described herein can be used to make three-dimensional (3D) printed articles that are porous or that have porous portions. In particular methods that involve 3D printing using a powder bed of polymer powder, a pore-promoting agent can be selectively applied to the powder bed. A fusing agent can also be selectively applied to the powder bed. Generally, the fusing agent can include a radiation absorber that can absorb radiation and convert the radiation to heat. After applying the fusing agent and the pore-promoting agent, the powder bed can be exposed to radiation. Portions of the powder bed where the fusing agent was applied can heat up to the point that the polymer powder can becomes fused together to form a solid layer. At the same time, the heat can cause the pore-promoting compound in the pore-promoting agent to react and form a gas. In some examples, the gas can become trapped as small bubbles in the molten polymer. When the polymer hardens, the bubbles can remain as pores within the polymer matrix. In some cases, the pore-promoting agent can be applied in the same areas as the fusing agent to make a 3D printed article that has uniform porosity throughout the article. In other examples, the pore-promoting agent can be printed on a limited portion of the area where the fusing agent was printed. This can form a 3D printed article that has a porous portion and a non-porous portion. Any size, shape, and number of porous portions can be designed and produced in the 3D printed article by selectively applying the pore-promoting agent.

Forming 3D printed article with porosity as described herein can be difficult using many 3D printing methods. In methods that use a powder bed, forming a 3D printed article with internal closed pores is not ideal because powder build material can become trapped inside the pores with no way to remove the powder after printing the article. Additionally, methods of 3D printing using powder build material are usually limited as to the size of features that can be formed by the printing resolution of the process. For example, a 3D printing process that involves applying a fusing agent to a powder bed may be used to form pores by designing the pores into the 3D object model and then printing the article with pores according to the 3D object model. However, the printing resolution of such a process can be limited by the resolution at which the fusing agent is applied to the powder bed and the particle size of the powder build material. Therefore, explicitly designing and printing pores using such a process can be limited to pores that are larger than the print resolution.

In contrast, the methods and materials described herein can be used to form pores that are smaller than the print resolution of the 3D printing process. In some examples, the pores formed using these methods can be smaller than the particle size of the polymer powder build material.

Porosity formed using the methods described herein can affect the overall properties of the 3D printed article. For example, a 3D printed article can be made porous in order to reduce the weight of the article. In another example, porosity can be introduced with the intention of reducing the stiffness or strength of the article. A certain portion of the 3D printed article may be made porous to make that particular portion less stiff if desired. Thus, the ability to selectively form porous portions in 3D printed articles can be useful in a variety of applications.

Additionally, the methods described herein can allow for the extent of porosity to be controlled and tuned. The pores are formed by a pore-promoting compound in the pore-promoting agent. The pore-promoting compound can be a compound that chemically reacts to form a gas when the compound is heated to an elevated temperature. In some examples, the level of porosity in the 3D printed article can be adjusted by changing the amount of pore-promoting agent that is applied to the build material. In other examples, the level of porosity can be adjusted by changing the amount of heating provided to the pore-promoting compound. For example, the build material with the pore-promoting compound applied thereto can be exposed to more intense radiation or exposed for a longer time to supply more heat to the pore-promoting compound, and thereby cause more of the pore-promoting compound to react to form gas. Accordingly, the methods described herein provide multiple avenues for controlling the porosity level in the 3D printed article.

Multi-Fluid Kits for Three-Dimensional Printing

Figure 1:
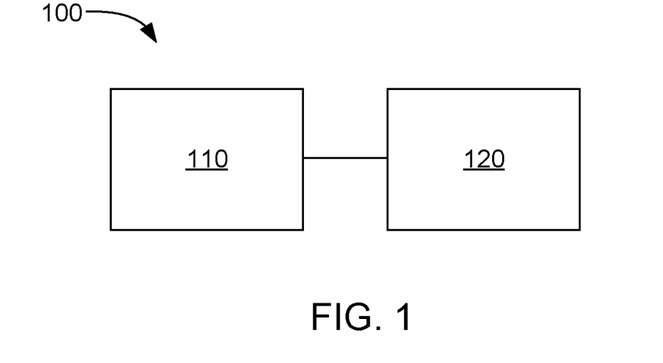
FIG. 1 is a schematic view of an example multi-fluid kit for three-dimensional printing in accordance with examples of the present disclosure.

With this description in mind, FIG. 1 shows a schematic of an example multi-fluid kit for three-dimensional printing 100. The multi-fluid kit includes a fusing agent 110 and a pore-promoting agent 120. The fusing agent can include water and a radiation absorber. The radiation absorber can absorb radiation energy and convert the radiation energy to heat. The pore-promoting agent can include water and a water-soluble pore-promoting compound. As described above, the fusing agent can be applied to a powder bed material in areas that are to be fused to form a layer of a 3D printed article. The pore-promoting agent can be applied to areas of the powder bed where porosity is to be formed.

Figure 2:
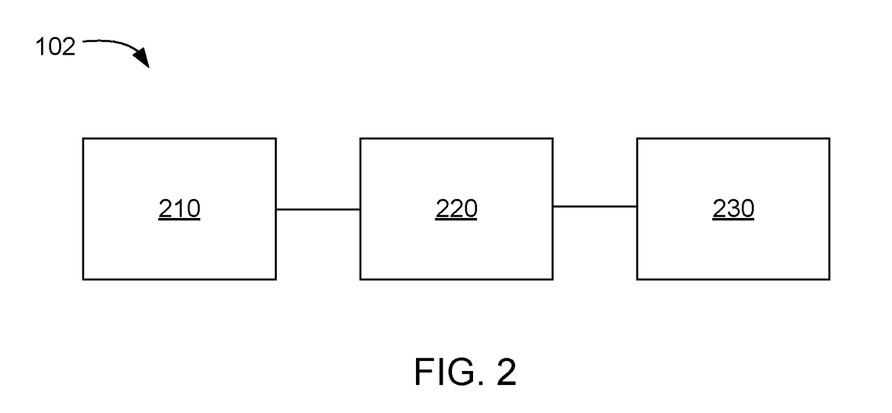
FIG. 2 is a schematic view of another example multi-fluid kit for three-dimensional printing in accordance with examples of the present disclosure.

FIG. 2 shows a schematic of another example multi-fluid kit for three-dimensional printing 200. This multi-fluid kit also includes a fusing agent 210 and a pore-promoting agent 220. Additionally, this multi-fluid kit includes a detailing agent 230. The detailing agent can include a detailing compound, which is a compound that can reduce the temperature of powder bed material onto which the detailing agent is applied. In some examples, the detailing agent can be applied around edges of the area where the fusing agent is applied. This can prevent powder bed material around the edges from caking due to heat from the area where the fusing agent was applied. The detailing agent can also be applied in the same area where fusing was applied in order to control the temperature and prevent excessively high temperatures when the powder bed material is fused.

Materials Kits for Three-Dimensional Printing

Figure 3:
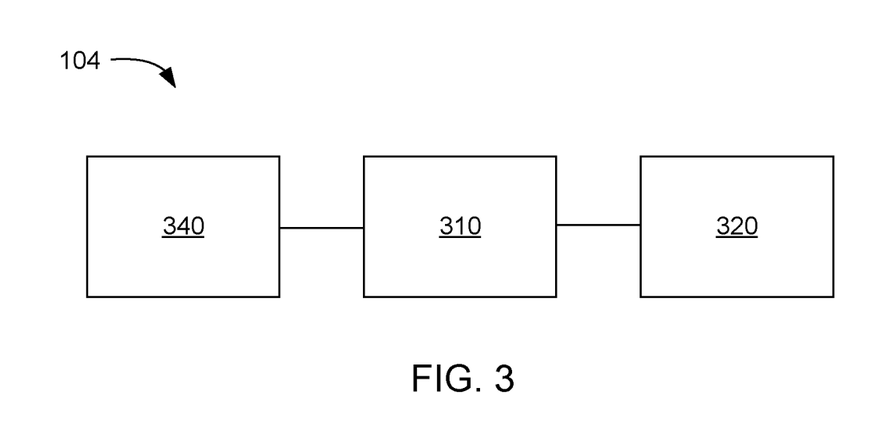
FIG. 3 is a schematic view of an example three-dimensional printing kit in accordance with examples of the present disclosure.

The present disclosure also describes materials kit for three-dimensional printing. In some examples, the materials kits can include materials that can be used in the three-dimensional printing processes described herein. FIG. 3 shows a schematic illustration of one example three-dimensional printing kit 300 in accordance with examples of the present disclosure. The kit includes a powder bed material 340 including polymer particles, a fusing agent 310 to selectively apply to the powder bed material, and a pore-promoting agent 320 to selectively apply to the powder bed material.

Three-Dimensional Printing with Multi-Fluid Kits and Materials Kits

Figure 4A:
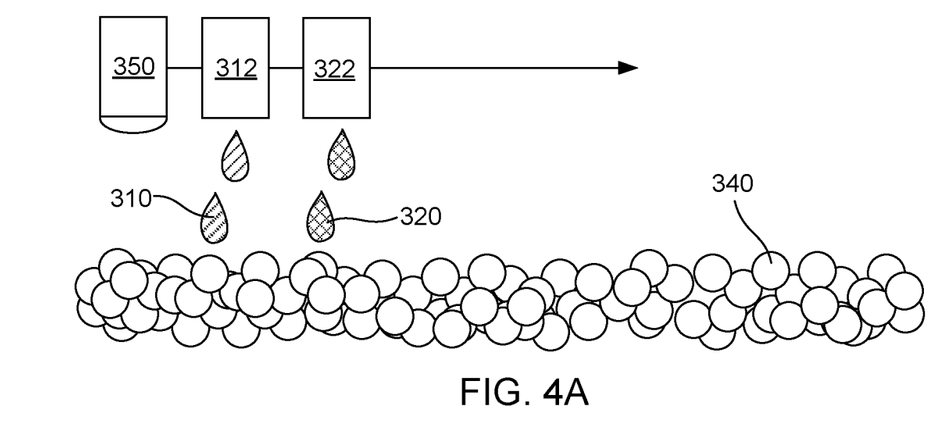
FIGS. 4A-4C show a schematic view of an example three-dimensional printing process using an example multi-fluid kit in accordance with examples of the present disclosure.
Figure 4B:
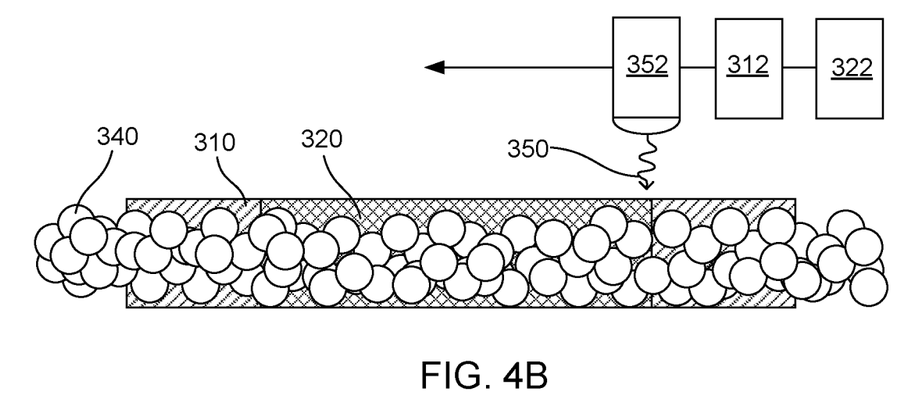
Figure 4C:
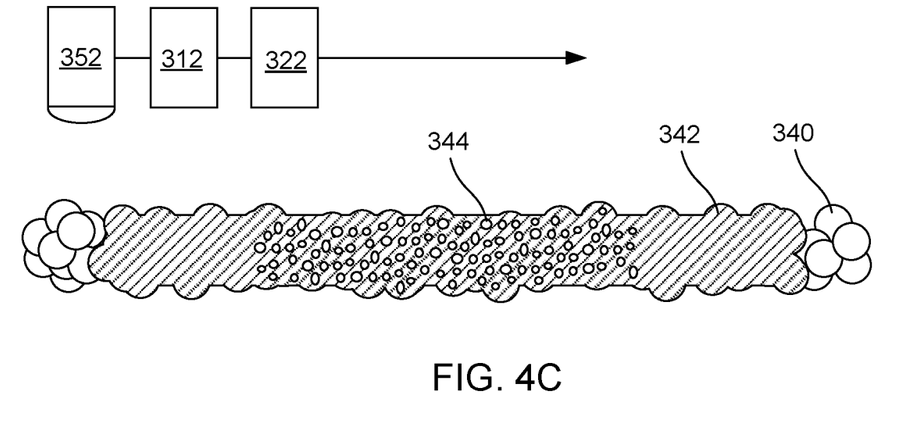

FIGS. 4A-4C illustrate one example of using the multi-fluid kits to form a 3D printed article. In FIG. 4A, a fusing agent 310 and a pore-promoting agent 320 are jetted onto a layer of powder bed material 340 including polymer particles. The fusing agent is jetted from a fusing agent ejector 312 and the pore-promoting agent is jetted from a pore-promoting agent ejector 322. These fluid ejectors can move across the layer of polymer particles to selectively jet fusing agent on areas that are to be fused, while the pore-promoting agent can be jetted onto areas that are to be made porous. If a detailing agent were to be used, there may be an additional detailing agent ejector (not shown) that contains detailing agent to be applied at or about boundary areas of the three-dimensional article being printed. Furthermore, a radiation source 352 can also move across the layer of polymer particles.

FIG. 4B shows the layer of powder bed material 340, which includes polymer particles, after the fusing agent 310 has been jetted onto an area of the layer that is to be fused. Additionally, the pore-promoting agent 320 has been jetted onto a portion of the area where the fusing agent was also jetted. In this figure, the radiation source 352 is shown emitting radiation 350 toward the layer of polymer particles. The fusing agent can include a radiation absorber that can absorb this radiation and convert the radiation energy to heat.

FIG. 4C shows the layer of powder bed material 340 including polymer particles with a fused portion 342 where the fusing agent was jetted. This portion has reached a sufficient temperature to fuse the polymer particles together to form a solid polymer matrix. The area where the pore-promoting agent was jetted becomes a porous portion 344. This portion includes many pores formed when the pore-promoting compound in the pore-promoting agent reacted to form gas when heated. The reaction formed gas bubbles in the molten polymer, and gas bubbles became trapped when the polymer re-solidified to form the solid polymer matrix.

As used herein, "pores" refers to void spaces in the solid polymer matrix. The void spaces may be individual, closed void spaces that are separated from other void spaces by solid polymer. In other examples, the void spaces may be interconnected with other void spaces. Thus, in various examples, depending on the extent of porosity, the pores can range from a fully interconnected network of voids to a collection of discrete, unconnected voids. In further examples, the void spaces can be filled by gas that is generated by a chemical reaction of the pore-promoting compound.

As used herein, "porosity" in a general context can refer to the present of pores in the fused polymer matrix. In the context of a specific value, "porosity" can be defined as the volume fraction of void space in the fused polymer with respect to the entire volume of the fused polymer together with the void space. The void space can refer to voids formed by the chemical reaction of the pore-promoting compound, and not void spaces designed into the 3D model for 3D printing the article in question. Any geometry designed into the 3D object model can be considered features of the "entire volume of the fused polymer" and the fraction of void space can be based on the voids formed by gas generated by the pore-promoting compound. Additionally, porosity can be measured with respect to the entire 3D printed article or with respect to a porous portion of the 3D printed article (where the pore-promoting agent was applied). In some examples, a porous portion of a 3D printed article made using the methods described herein can have a porosity from about 0.5 vol % to about 50 vol %. In further examples, the porous portion can have a porosity from about 1 vol % to about 30 vol % or from about 5 vol % to about 20 vol %. Additionally, the size of the pores can vary. In some examples, the pores can have an average diameter from about 1 micrometer to about 500 micrometers. In further examples, the pores can have an average diameter from about 2 micrometers to about 300 micrometers or from about 5 micrometers to about 50 micrometers.

Powder Bed Material

In certain examples, the powder bed material can include polymer particles having a variety of shapes, such as substantially spherical particles or irregularly-shaped particles. In some examples, the polymer powder can be capable of being formed into 3D printed objects with a resolution of about 20 µm to about 100 µm, about 30 µm to about 90 µm, or about 40 µm to about 80 µm. As used herein, "resolution" refers to the size of the smallest feature that can be formed on a 3D printed object. The polymer powder can form layers from about 20 µm to about 100 µm thick, allowing the fused layers of the printed part to have roughly the same thickness. This can provide a resolution in the z-axis (i.e., depth) direction of about 20 µm to about 100 µm. The polymer powder can also have a sufficiently small particle size and sufficiently regular particle shape to provide about 20 µm to about 100 µm resolution along the x-axis and y-axis (i.e., the axes parallel to the top surface of the powder bed). For example, the polymer powder can have an average particle size from about 20 µm to about 100 µm. In other examples, the average particle size can be from about 20 µm to about 50 µm. Other resolutions along these axes can be from about 30 µm to about 90 µm or from 40 µm to about 80 µm.

The polymer powder can have a melting or softening point from about 70° C. to about 350° C. In further examples, the polymer can have a melting or softening point from about 150° C. to about 200° C. A variety of thermoplastic polymers with melting points or softening points in these ranges can be used. For example, the polymer powder can be polyamide 6 powder, polyamide 9 powder, polyamide 11 powder, polyamide 12 powder, polyamide 6,6 powder, polyamide 6,12 powder, polyethylene powder, wax, thermoplastic polyurethane powder, acrylonitrile butadiene styrene powder, amorphous polyamide powder, polymethylmethacrylate powder, ethylene-vinyl acetate powder, polyarylate powder, silicone rubber, polypropylene powder, polyester powder, polycarbonate powder, copolymers of polycarbonate with acrylonitrile butadiene styrene, copolymers of polycarbonate with polyethylene terephthalate polyether ketone powder, polyacrylate powder, polystyrene powder, or mixtures thereof. In a specific example, the polymer powder can be polyamide 12, which can have a melting point from about 175° C. to about 200° C. In another specific example, the polymer powder can be thermoplastic polyurethane.

The thermoplastic polymer particles can also in some cases be blended with a filler. The filler can include inorganic particles such as alumina, silica, fibers, carbon nanotubes, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer particles to filler particles can be from about 100:1 to about 1:2 or from about 5:1 to about 1:1.

Fusing Agents

The multi-fluid kits and materials kits for three-dimensional printing described herein can include a fusing agent to be applied to the polymer build material. The fusing agent can include a radiation absorber that can absorb radiant energy and convert the energy to heat. In certain examples, the fusing agent can be used with a powder bed material in a particular 3D printing process. A thin layer of powder bed material can be formed, and then the fusing agent can be selectively applied to areas of the powder bed material that are desired to be consolidated to become part of the solid 3D printed object. The fusing agent can be applied, for example, by printing such as with a fluid ejector or fluid jet printhead. Fluid jet printheads can jet the fusing agent in a similar way to an inkjet printhead jetting ink. Accordingly, the fusing agent can be applied with great precision to certain areas of the powder bed material that are desired to form a layer of the final 3D printed object. After applying the fusing agent, the powder bed material can be irradiated with radiant energy. The radiation absorber from the fusing agent can absorb this energy and convert it to heat, thereby heating any polymer particles in contact with the radiation absorber. An appropriate amount of radiant energy can be applied so that the area of the powder bed material that was printed with the fusing agent heats up enough to melt the polymer particles to consolidate the particles into a solid layer, while the powder bed material that was not printed with the fusing agent remains as a loose powder with separate particles.

In some examples, the amount of radiant energy applied, the amount fusing agent applied to the powder bed, the concentration of radiation absorber in the fusing agent, and the preheating temperature of the powder bed (i.e., the temperature of the powder bed material prior to printing the fusing agent and irradiating) can be tuned to ensure that the portions of the powder bed printed with the fusing agent will be fused to form a solid layer and the unprinted portions of the powder bed will remain a loose powder. These variables can be referred to as parts of the "print mode" of the 3D printing system. Generally, the print mode can include any variables or parameters that can be controlled during 3D printing to affect the outcome of the 3D printing process.

Generally, the process of forming a single layer by applying fusing agent and irradiating the powder bed can be repeated with additional layers of fresh powder bed material to form additional layers of the 3D printed article, thereby building up the final object one layer at a time. In this process, the powder bed material surrounding the 3D printed article can act as a support material for the object. When the 3D printing is complete, the article can be removed from the powder bed and any loose powder on the article can be removed.

Accordingly, in some examples, the fusing agent can include a radiation absorber that is capable of absorbing electromagnetic radiation to produce heat. The radiation absorber can be colored or colorless. In various examples, the radiation absorber can be a pigment such as carbon black pigment, glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, radiation absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly (acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_5$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In further examples, the radiation absorber can include a metal dithiolene complex. Transition metal dithiolene complexes can exhibit a strong absorption band in the 600 nm to 1600 nm region of the electromagnetic spectrum. In some examples, the central metal atom can be any metal that can form square planer complexes. Non-limiting specific examples include complexes based on nickel, palladium, and platinum.

A dispersant can be included in the fusing agent in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctylphenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the polymer powder, the amount of radiation absorber in the polymer powder can be from about 0.0003 wt % to about 10 wt %, or from about 0.005 wt % to about 5 wt %, with respect to the weight of the polymer powder.

In some examples, the fusing agent can be jetted onto the polymer powder build material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble radiation absorber can be used with an aqueous vehicle. Because the radiation absorber is dispersible or soluble in water, an organic co-solvent may not be present, as it may not be included to solubilize the radiation absorber. Therefore, in some examples the fluids can be substantially free of organic solvent, e.g., predominantly water. However, in other examples a co-solvent can be used to help disperse other dyes or pigments, or enhance the jetting properties of the respective fluids. In still further examples, a non-aqueous vehicle can be used with an organic-soluble or organic-dispersible fusing agent.

In certain examples, a high boiling point co-solvent can be included in the fusing agent. The high boiling point co-solvent can be an organic co-solvent that boils at a temperature higher than the temperature of the powder bed during printing. In some examples, the high boiling point co-solvent can have a boiling point above about 250° C. In still further examples, the high boiling point co-solvent can be present in the fusing agent at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as Tergitol™ 15-S-12, Tergitol™ 15-S-7 available from Dow Chemical Company (Michigan), LEG-1 and LEG-7; Triton™ X-100; Triton™ X-405 available from Dow Chemical Company (Michigan); and sodium dodecylsulfate.

Various other additives can be employed to enhance certain properties of the fusing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

Pore-Promoting Agents

The pore-promoting agent can include a water-soluble pore-promoting compound that can chemically react at an elevated temperature to generate a gas. As used herein, "chemically react" refers to a change in chemical composition and not a mere phase change from liquid or solid to gas. Many liquid solvents can evaporate to form a gas at an elevated temperature. However, the pore-promoting compound described herein does not refer to a liquid that evaporates at the elevated temperature. Instead, the pore-promoting compound undergoes a chemical reaction to form a different compound. The product of this chemical reaction can be a gas, and the gas can remain in a gaseous state even after cooling back to room temperature. In some examples, the chemical reaction of the pore-promoting compound can proceed without any other reactants besides the pore-promoting compound. In certain examples, the pore-promoting compound can chemically decompose to form smaller molecules, and the product molecules can include a gas.

Non-limiting examples of pore-promoting compounds can include carbohydrazide, urea, a urea homologue, a carbamide-containing compound, ammonium carbonate, ammonium nitrate, ammonium nitrite, and combinations thereof. As used herein, "urea homologue" can refer to methylurea and dimethylurea. These compounds can chemically decompose to form a gas when heated to a decomposition temperature. In some examples, the gas formed can include carbon dioxide gas.

In some examples, the pore-promoting agent can react to form a gas at an elevated temperature that is reached during the 3D printing process. In some examples, the elevated temperature at which the pore-promoting compound reacts can be from about 100° C. to about 250° C. In further examples, the elevated temperature can be from about 150° C. to about 250° C. or from about 190° C. to about 240° C. In certain examples, the elevated temperature can be at or near the melting or softening point temperature of the polymer particles in the powder bed. For example, the elevated temperature can be within 20° C., within 15° C., or within 10° C. of the melting or softening point of the polymer particles. Thus the pore-promoting compound can react when the polymer particles are fused during the 3D printing process. In other examples, the elevated temperature at which the pore-promoting reacts can be higher than the melting or softening point of the polymer particles. During the 3D printing process, a sufficient amount of fusing agent can be applied to the polymer particles and a sufficient amount of radiation energy can be applied to heat the pore-promoting compound to the temperature at which the pore-promoting compound will react.

In some cases, the pore-promoting compound that is applied to the powder bed can react completely to form gas when the powder bed is heated during fusing of the polymer particles. In other words, all or nearly all of the pore-promoting compound can react to yield the gas. In other examples, a portion of the pore-promoting compound can react and another portion can remain unreacted. In certain examples, from about 50 wt % to about 100 wt % of the pore-promoting compound can react. In other examples, from about 60 wt % to about 95 wt % or from about 70 wt % to about 90 wt % of the pore-promoting compound can react. In still further examples, less of the pore-promoting compound can react. For example, from about 10 wt % to about 70 wt %, or from about 20 wt % to about 60 wt %, or from about 30 wt % to about 50 wt % of the pore-promoting compound can react. The amount of the pore-promoting compound that reacts can in some cases depend on the temperature to which the powder bed is heated, the length of time that the powder is held at that temperature, the total amount of radiation energy applied to the powder bed, and so on. Accordingly, in some examples, the amount of radiation energy applied, the length of time that the powder bed is heated, to temperature reached by the powder bed, the amount of fusing agent applied to the powder bed, and other variables can affect the extent of the reaction of the pore-promoting compound. Therefore, these variables can affect the porosity of the final 3D printed article. These variables can be parts of the "print mode" of the 3D printing process. The porosity can also be affected by changing the amount of pore-promoting agent that is applied to the powder bed. Accordingly, the print mode can be adjusted to affect the level of porosity in the 3D printed article.

The total amount of pore-promoting compound that is present in the powder bed can directly affect the porosity of the 3D printed article. As mentioned above, this variable can be adjusted by changing the amount of pore-promoting agent that is applied to the powder bed. Alternatively, the amount of pore-promoting compound applied to the powder bed can be changed by changing the concentration of pore-promoting compound in the pore-promoting agent. The amount of pore-promoting compound can be selected to allow the pore-promoting agent to be jettable from a fluid jet printhead. In certain examples, the concentration of the pore-promoting compound in the pore-promoting agent can be from about 0.5 wt % to about 10 wt % with respect to the total weight of the pore-promoting agent. In further examples, the concentration of pore-promoting compound can be from 1 wt % to 8 wt % or from 2 wt % to 7 wt %.

The pore-promoting agent can also include ingredients to allow the pore-promoting agent to be jetted by a fluid jet printhead. In some examples, the pore-promoting agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

Detailing Agents

In further examples, multi-fluid kits or materials kits for three-dimensional printing can include a detailing agent. The detailing agent can include a detailing compound. The detailing compound can be capable of reducing the temperature of the powder bed material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

In some examples, the detailing compound can be a solvent that evaporates at the temperature of the powder bed. In some cases the powder bed can be preheated to a preheat temperature within about 10° C. to about 70° C. of the fusing temperature of the polymer powder. Depending on the type of polymer powder used, the preheat temperature can be in the range of about 90° C. to about 200° C. or more. The detailing compound can be a solvent that evaporates when it comes into contact with the powder bed at the preheat temperature, thereby cooling the printed portion of the powder bed through evaporative cooling. In certain examples, the detailing agent can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and combinations thereof. In some examples, the detailing agent can be mostly water. In a particular example, the detailing agent can be about 85 wt % water or more. In further examples, the detailing agent can be about 95 wt % water or more. In still further examples, the detailing agent can be substantially devoid of radiation absorbers. That is, in some examples, the detailing agent can be substantially devoid of ingredients that absorb enough radiation energy to cause the powder to fuse. In certain examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

Methods of Making 3D Printed Articles

Figure 5:
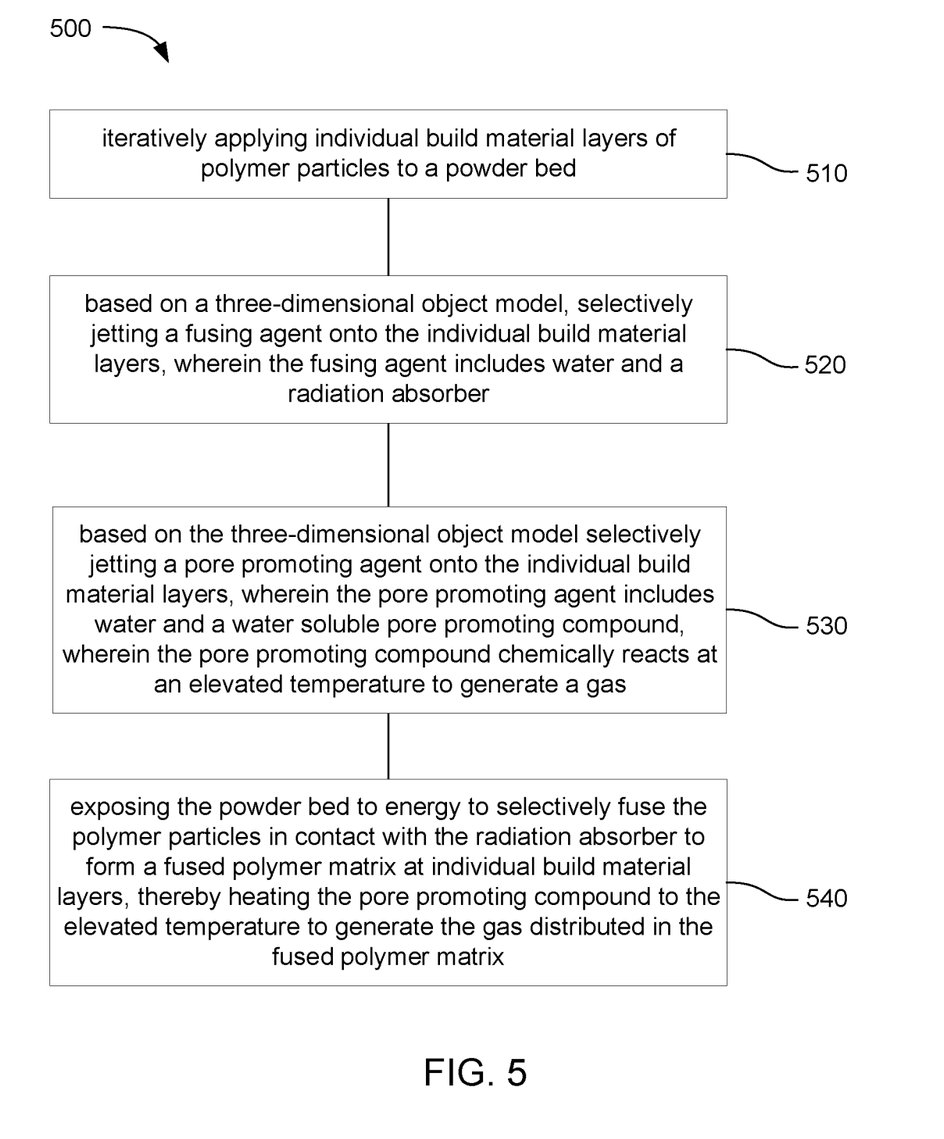
FIG. 5 is a flowchart illustrating an example method of making a three-dimensional printed article in accordance with examples of the present disclosure.

The present disclosure also describes methods of making three-dimensional printed articles. FIG. 5 shows a flowchart illustrating one example method 500 of making a three-dimensional printed article. The method includes: iteratively applying individual build material layers of polymer particles to a powder bed 510; based on a three-dimensional object model, selectively jetting a fusing agent onto the individual build material layers, wherein the fusing agent includes water and a radiation absorber 520; based on the three-dimensional object model selectively jetting a pore-promoting agent onto the individual build material layers, wherein the pore-promoting agent includes water and a water-soluble pore-promoting compound, wherein the pore-promoting compound chemically reacts at an elevated temperature to generate a gas 530; and exposing the powder bed to energy to selectively fuse the polymer particles in contact with the radiation absorber to form a fused polymer matrix at individual build material layers, thereby heating the pore-promoting compound to the elevated temperature to generate the gas distributed in the fused polymer matrix 540. The polymer particles, fusing agent, and pore-promoting agent can have any of the ingredients and properties described above.

In some examples, a detailing agent can also be jetted onto the powder bed. As described above, the detailing agent can be a fluid that reduces the maximum temperature of the polymer powder on which the detailing agent is printed. In particular, the maximum temperature reached by the powder during exposure to electromagnetic energy can be less in the areas where the detailing agent is applied. In certain examples, the detailing agent can include a solvent that evaporates from the polymer powder to evaporatively cool the polymer powder. The detailing agent can be printed in areas of the powder bed where fusing is not desired. In particular examples, the detailing agent can be printed along the edges of areas where the fusing agent is printed. This can give the fused layer a clean, defined edge where the fused polymer particles end and the adjacent polymer particles remain unfused. In other examples, the detailing agent can be printed in the same area where the fusing agent is printed to control the temperature of the area to be fused. In certain examples, some areas to be fused can tend to overheat, especially in central areas of large fused sections. To control the temperature and avoid overheating (which can lead to melting and slumping of the build material), the detailing agent can be applied to these areas As mentioned above, in some examples, the elevated temperature at which the pore-promoting compound chemically reacts can be from about 100° C. to about 250° C. The pore-promoting compound, and the powder bed material onto which the pore-promoting compound was jetted, can reach this elevated temperature when the radiation energy is applied to the powder bed. In some examples, the elevated temperature can be at or near the melting or softening point of the polymer particles in the powder bed. In other examples, the elevated temperature can be above or below the melting or softening point of the polymer particles. In any of these examples, the pore-promoting compound can be heated to a sufficient temperature to react and form a gas while the polymer particles are in a melted or softened state so that gas bubbles can form in the melted or softened polymer.

Also as mentioned above, a variety of variables of the "print mode" can be adjusted to affect the level of porosity in the 3D printed article. In some examples, the methods of making 3D printed articles can include adjusting these variables to modify the level of porosity. In certain examples, the variables can include the amount of fusing agent applied to the powder bed, the amount of pore-promoting agent applied to the powder bed, the thickness of individual layers of build material, the intensity and duration of radiation applied to the powder bed, the preheating temperature of the powder bed, and so on.

The fusing agent and pore-promoting agent can be jetted onto the powder bed using fluid jet print heads. The amount of pore-promoting agent jetted onto the powder can be calibrated based on the concentration of pore-promoting compound in the pore-promoting agent, the desired porosity of the resulting porous portion to be printed, among other factors. Similarly, the amount of the fusing agent used can be calibrated based on the concentration of radiation absorber in the fusing agent, the level of fusing desired for the polymer particles, and other factors. In some examples, the amount of fusing agent printed can be sufficient to contact the radiation absorber with the entire layer of polymer powder. For example, if an individual layer of polymer powder is 100 microns thick, then the fusing agent can penetrate 100 microns into the polymer powder. Thus the fusing agent can heat the polymer powder throughout the entire layer so that the layer can coalesce and bond to the layer below. After forming a solid layer, a new layer of loose powder can be formed, either by lowering the powder bed or by raising the height of a powder roller and rolling a new layer of powder.

In some examples, the entire powder bed can be preheated to a temperature below the melting or softening point of the polymer powder. In one example, the preheat temperature can be from about 10° C. to about 30° C. below the melting or softening point. In another example, the preheat temperature can be within 50° C. of the melting of softening point. In a particular example, the preheat temperature can be from about 160° C. to about 170° C. and the polymer powder can be nylon 12 powder. In another example, the preheat temperature can be about 90° C. to about 100° C. and the polymer powder can be thermoplastic polyurethane. Preheating can be accomplished with a lamp or lamps, an oven, a heated support bed, or other types of heaters. In some examples, the entire powder bed can be heated to a substantially uniform temperature.

The powder bed can be irradiated with a fusing lamp. Suitable fusing lamps for use in the methods described herein can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure used to coalesce the individual printed layer. The fusing lamp can be configured to irradiate the entire powder bed with a substantially uniform amount of energy. This can selectively coalesce the printed portions with fusing agent leaving the unprinted portions of the polymer powder below the melting or softening point.

In one example, the fusing lamp can be matched with the radiation absorber in the fusing agent so that the fusing lamp emits wavelengths of light that match the peak absorption wavelengths of the radiation absorber. A radiation absorber with a narrow peak at a particular near-infrared wavelength can be used with a fusing lamp that emits a narrow range of wavelengths at approximately the peak wavelength of the radiation absorber. Similarly, a radiation absorber that absorbs a broad range of near-infrared wavelengths can be used with a fusing lamp that emits a broad range of wavelengths. Matching the radiation absorber and the fusing lamp in this way can increase the efficiency of coalescing the polymer particles with the fusing agent printed thereon, while the unprinted polymer particles do not absorb as much light and remain at a lower temperature.

Depending on the amount of radiation absorber present in the polymer powder, the absorbance of the radiation absorber, the preheat temperature, and the melting or softening point of the polymer, an appropriate amount of irradiation can be supplied from the fusing lamp. In some examples, the fusing lamp can irradiate individual layers for from about 0.5 to about 10 seconds per pass.

The 3D printed article can be formed by jetting a fusing agent onto layers of powder bed build material according to a 3D object model. 3D object models can in some examples be created using computer aided design (CAD) software. 3D object models can be stored in any suitable file format. In some examples, a 3D printed article as described herein can be based on a single 3D object model. The 3D object model can define the three-dimensional shape of the article and the three-dimensional shape of porous portions to be formed in the 3D printed article. In other examples, the article can be defined by a first 3D object model and the porous portions can be defined by a second 3D object model. Other information may also be included, such as structures to be formed of additional different materials or color data for printing the article with various colors at different locations on the article. The 3D object model may also include features or materials specifically related to jetting fluids on layers of powder bed material, such as the desired amount of fluid to be applied to a given area. This information may be in the form of a droplet saturation, for example, which can instruct a 3D printing system to jet a certain number of droplets of fluid into a specific area. This can allow the 3D printing system to finely control radiation absorption, cooling, color saturation, concentration of the pore-promoting compound, and so on. All this information can be contained in a single 3D object file or a combination of multiple files. The 3D printed article can be made based on the 3D object model. As used herein, "based on the 3D object model" can refer to printing using a single 3D object model file or a combination of multiple 3D object models that together define the article. In certain examples, software can be used to convert a 3D object model to instructions for a 3D printer to form the article by building up individual layers of build material.

In an example of the 3D printing process, a thin layer of polymer powder can be spread on a bed to form a powder bed. At the beginning of the process, the powder bed can be empty because no polymer particles have been spread at that point. For the first layer, the polymer particles can be spread onto an empty build platform. The build platform can be a flat surface made of a material sufficient to withstand the heating conditions of the 3D printing process, such as a metal. Thus, "applying individual build material layers of polymer particles to a powder bed" includes spreading polymer particles onto the empty build platform for the first layer. In other examples, a number of initial layers of polymer powder can be spread before the printing begins. These "blank" layers of powder bed material can in some examples number from about 10 to about 500, from about 10 to about 200, or from about 10 to about 100. In some cases, spreading multiple layers of powder before beginning the print can increase temperature uniformity of the 3D printed article. A fluid jet printing head, such as an inkjet print head, can then be used to print a fusing agent including a radiation absorber over portions of the powder bed corresponding to a thin layer of the 3D article to be formed. Then the bed can be exposed to electromagnetic energy, e.g., typically the entire bed. The electromagnetic energy can include light, infrared radiation, and so on. The radiation absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of polymer powder can be spread over the powder bed and the process can be repeated to form additional layers until a complete 3D article is printed. Thus, "applying individual build material layers of polymer particles to a powder bed" also includes spreading layers of polymer particles over the loose particles and fused layers beneath the new layer of polymer particles.

In certain examples, the 3D printed article can be formed with porosity throughout the 3D printed article, or with a porous portion of any desired shaped located in any desired location within the 3D printed article. In one example, the 3D printed article can have a porous interior and a solid exterior surface. For example, the 3D printed article can be designed to have a solid layer or shell without any pore-promoting agent and then an interior portion where the pore-promoting agent is applied. In some examples, the solid shell can be from about 20 micrometers to about 2,000 micrometers thick, or any other desired thickness. In further examples, porosity can be formed in the 3D printed article for the purpose of reducing the weight of the article, increasing buoyancy of the article, decreasing strength of the article, increasing flexibility of the article, and so on. In one example, a certain portion of the article can be made highly porous to form a breakaway segment that can be snapped apart with moderate force. In another example, a portion of the article can be made porous while other portions are non-porous, to provide for a more flexible porous segment connected to more rigid non-porous segments. In yet another example, a hidden label, code, or identification mark can be formed using the pore-promoting agent. For example, a porous portion of a particular shaped can be formed in the interior of the 3D printed article beneath the surface, so that the porous portion is not visible to the human eye. The porous portion can be detected using detection equipment to find or read the hidden identification label or code. In this way, a porous label or code can be used to verify authenticity of a 3D printed article or to store information about the 3D printed article. Besides these examples, 3D printed articles with porous portions can be used for a variety of additional applications.

Definitions

It is noted that, as used in this specification and the appended claims, the singular forms "a," "an," and "the" include plural referents unless the context clearly dictates otherwise.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe pigment colorants, and also other pigments such as organometallics, ferrites, ceramics, etc. In one specific aspect, however, the pigment is a pigment colorant.

As used herein, "ink jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context. When using the term "substantial" or "substantially" in the negative, e.g., substantially devoid of a material, what is meant is from none of that material is present, or at most, trace amounts could be present at a concentration that would not impact the function or properties of the composition as a whole.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though individual members of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if a numerical value and sub-range is explicitly recited. As an illustration, a numerical range of "about 1 wt % to about 5 wt %" should be interpreted to include the explicitly recited values of about 1 wt % to about 5 wt %, and also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

The following illustrates examples of the present disclosure. However, it is to be understood that the following are merely illustrative of the application of the principles of the present disclosure. Numerous modifications and alternative devices, methods, and systems may be devised without departing from the spirit and scope of the present disclosure. The appended claims are intended to cover such modifications and arrangements.

To test the efficacy of urea as a pore-promoting compound, a series of fusing agents were formulated with urea added. The fusing agents included 5 wt %, 10 wt %, or 20 wt % urea. The fusing agents also included additional ingredients as shown in Table 1.ski

TABLE 1

| Ingredient | Concentration (wt %) |
|---|---|
| Organic Co-solvent | 5-30 |
| High Boiling Point Solvent | 1-10 |
| Wetting Agent | 0.01-1 |
| Emulsifier | 0.01-1 |
| Chelating Agent | 0.01-1 |
| Biocide | 0.01-1 |
| Carbon Black Pigment | 1-10 |
| Deionized Water | balance |

Initially, the 5 wt % urea fusing agent was used in a HP Multi Jet Fusion 3D® printing test print bed. It was found that over melting or over fusing of the layers occurred when a fusing speed of 18 inches per second (i.e., the speed at which the fusing lamp passes across the powder bed) was used. Over melting causes the final 3D printed article to have inaccurate dimensions. By adjusting the fusing speed to 20 inches per second, much better dimensional accuracy was achieved. A series of four 3D printed articles were formed using identical 3D object models. Two of the articles were printed with the fusing agent having 5 wt % urea and two were printed with a control fusing agent containing no urea. The dimensions and mass of the 3D printed articles were measured and are shown in Table 2 below.

TABLE 2

| Article No. | Width (mm) | Thickness (mm) | Area (cm$^2$) | Mass (g) |
|---|---|---|---|---|
| 1 (control) | 3.18 | 3.9 | 0.12 | 1.677 |
| 2 (control) | 3.22 | 3.9 | 0.13 | 1.684 |
| 3 | 3.26 | 3.95 | 0.13 | 1.578 |
| 4 | 3.21 | 3.97 | 0.13 | 1.581 |

The 3D printed articles printed using the urea fusing agent had approximately the same dimensions as the 3D printed articles printed using the control fusing agent. However, the articles printed with the urea fusing agent had less mass by about 0.1 grams. This indicates that a portion of the volume of the articles was likely occupied by gas-filled pores.

The tensile strength and Young's modulus of the 3D printed articles were then tested. The results are shown in Table 3.

TABLE 3

| Article No. | Stress at Yield (MPa) | Tensile Stress at Maximum Load (MPa) | Young's Modulus (MPa) | % Strain at Yield | % Strain at Break |
|---|---|---|---|---|---|
| 1 (control) | 46.26 | 46.26 | 1323.58 | 13.09 | 62.69 |
| 2 (control) | 46.11 | 46.11 | 1244.58 | 12.73 | 80.07 |
| 3 | 36.51 | 36.51 | 855.43 | 14.68 | 73.28 |
| 4 | 37.34 | 37.34 | 915.57 | 16.1 | 74.78 |

The articles printed using urea had significantly lower stress at yield and Young's modulus. However, the elongation at break was not significantly affected, suggesting that overall fusing, crystallization, and polymer stability was not compromised with the introduction of urea.

Figure 6A:
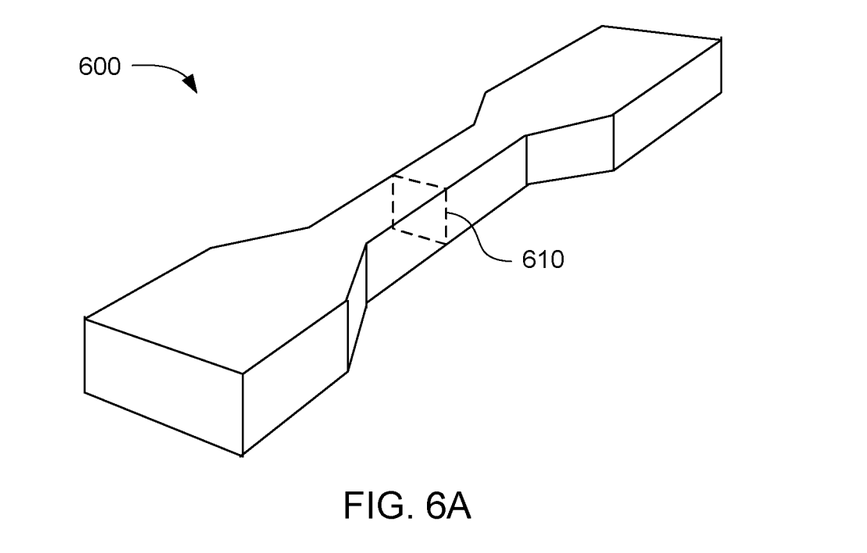
FIGS. 6A-6B show an example three-dimensional printed article and a cross-section of the three-dimensional printed article in accordance with examples of the present disclosure.
Figure 6B:
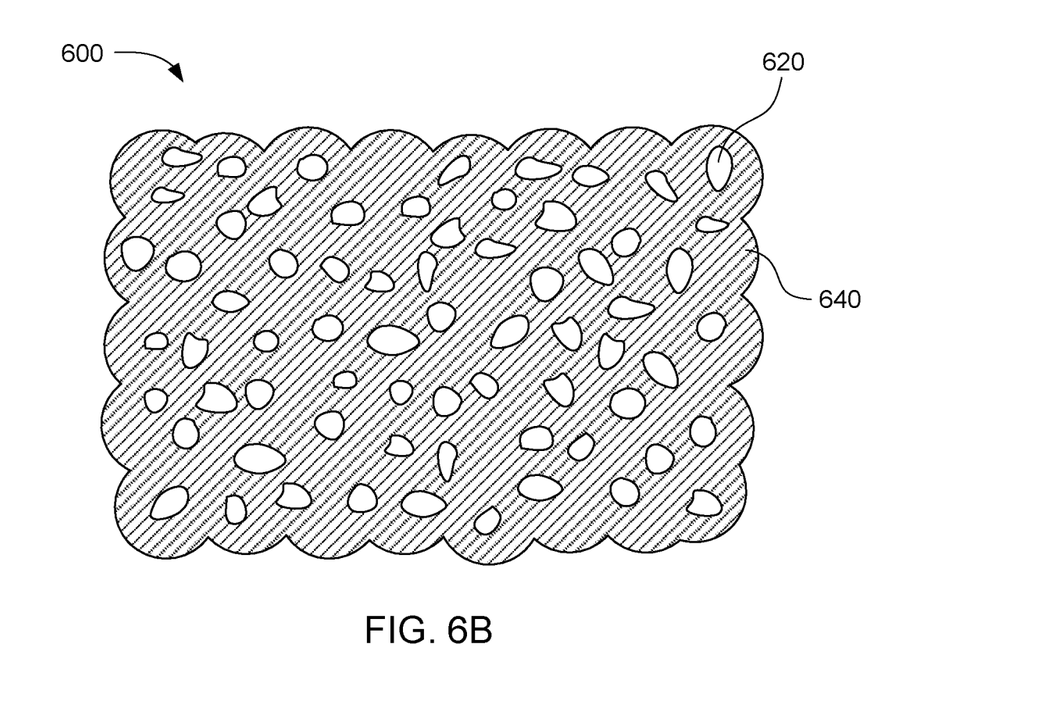

One of the control 3D printed articles and one of the articles printed using urea were sliced using a razor blade to view the cross section. The article printed using urea was significantly easier to cut because it had a more spongy texture. The control 3D printed article was substantially solid polymer all the way through, while the article printed using urea had fairly uniform and monodisperse pores through the interior of the article. FIG. 6A illustrates a perspective view of the 3D printed article 600 that was printed using the urea fusing agent. The article was cut along plane 610 to view the cross section, shown at FIG. 6B. More specifically, FIG. 6B shows a schematic cross sectional representation of the 3D printed article with many small pores 620 formed through the solid polymer matrix 640 (not to scale).

These results indicate that a fluid agent that includes urea can be used to form porosity in a 3D printed article, and that this can also affect properties of the article such as stress at yield and Young's modulus.

What is claimed is:

1. A materials kit for three-dimensional printing, comprising:
    a powder bed material comprising crystalline or semi-crystalline polymer particles selected from the group consisting of nylon 6 particles, nylon 9 particles, nylon 11 particles, nylon 12 particles, nylon 6,6 particles, nylon 6,12 particles, polyethylene particles, polypropylene particles, polyester particles, polyether ketone particles, polyacrylate particles, and a combination thereof;
    a fusing agent comprising water and a radiation absorber to selectively apply to the powder bed material, wherein the radiation absorber absorbs radiation energy and converts the radiation energy to heat; and
    a pore-promoting agent comprising water and a water-soluble pore-promoting compound to selectively apply to the powder bed material, wherein the pore-promoting compound:
        is selected from the group consisting of a carbohydrazide, urea, a urea homologue, a carbamide-containing compound, ammonium carbonate, ammonium nitrate, ammonium nitrite, and a combination thereof;
        chemically reacts at an elevated temperature to generate a gas; and
        is present in the pore-promoting agent in an amount of from about 0.5 wt % to about 8 wt % with respect to a total weight of the pore-promoting agent.

2. The materials kit of claim 1, wherein the crystalline or semi-crystalline polymer particles have an average particle size ranging from about 20 μm to about 100 μm.

3. The materials kit of claim 1, wherein the radiation absorber is selected from the group consisting of a metal dithiolene complex, carbon black, a near-infrared absorbing dye, a near-infrared absorbing pigment, metal nanoparticles, a conjugated polymer, and a combination thereof.

4. The materials kit of claim 1, wherein the elevated temperature at which the pore-promoting compound chemically reacts ranges from about 100° C. to about 250° C.

5. A method of making a three-dimensional printed article, comprising:
    iteratively applying individual build material layers of crystalline or semi-crystalline polymer particles to a powder bed, the crystalline or semi-crystalline polymer particles selected from the group consisting of nylon 6 particles, nylon 9 particles, nylon 11 particles, nylon 12 particles, nylon 6,6 particles, nylon 6,12 particles, polyethylene particles, polypropylene particles, polyester particles, polyether ketone particles, polyacrylate particles, and a combination thereof;
    based on a three-dimensional object model, selectively jetting a fusing agent onto the individual build material layers, wherein the fusing agent comprises water and a radiation absorber;
    based on the three-dimensional object model, selectively jetting a pore-promoting agent onto the individual build material layers, wherein the pore-promoting agent comprises water and a water-soluble pore-promoting compound selected from the group consisting of a carbohydrazide, urea, a urea homologue, a carbamide-containing compound, ammonium carbonate, ammonium nitrate, ammonium nitrite, and a combination thereof, and wherein the pore-promoting compound chemically reacts at an elevated temperature to generate a gas and is present in the pore-promoting agent in an amount of from about 0.5 wt % to about 8 wt % with respect to a total weight of the pore-promoting agent; and
    exposing the powder bed to energy to selectively fuse the crystalline or semi-crystalline polymer particles in contact with the radiation absorber to form a fused polymer matrix at the individual build material layers, thereby heating the pore-promoting compound to the elevated temperature to generate the gas distributed in the fused polymer matrix.

6. The method of claim 5, wherein the elevated temperature ranges from about 100° C. to about 250° C.

7. The method of claim 5, wherein the gas forms isolated pores in the fused polymer matrix, the pores having an average diameter ranging from about 1 micrometer to about 500 micrometers.

* * * * *